(12) United States Patent
Dasgupta et al.

(10) Patent No.: US 10,891,534 B2
(45) Date of Patent: Jan. 12, 2021

(54) NEURAL NETWORK REINFORCEMENT LEARNING

(71) Applicant: INTERNATIONAL BUSINESS MACHINES CORPORATION, Armonk, NY (US)

(72) Inventors: Sakyasingha Dasgupta, Tokyo (JP); Takayuki Osogami, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 820 days.

(21) Appl. No.: 15/403,917

(22) Filed: Jan. 11, 2017

(65) Prior Publication Data

US 2018/0197079 A1 Jul. 12, 2018

(51) Int. Cl.
*G06N 3/00* (2006.01)
*G06N 3/04* (2006.01)
*G06N 3/08* (2006.01)

(52) U.S. Cl.
CPC ............ *G06N 3/006* (2013.01); *G06N 3/049* (2013.01); *G06N 3/0445* (2013.01); *G06N 3/088* (2013.01)

(58) Field of Classification Search
CPC .................................................... G06N 3/006
See application file for complete search history.

(56) References Cited

U.S. PATENT DOCUMENTS

| 9,189,730 B1* | 11/2015 | Coenen ................. G06N 3/049 |
| 9,367,798 B2 | 6/2016 | Coenen et al. |
| 9,367,820 B2 | 6/2016 | Newnham et al. |
| 9,710,265 B1 | 7/2017 | Temam et al. |
| 2009/0177602 A1 | 7/2009 | Ning et al. |
| 2015/0278685 A1 | 10/2015 | Zheng et al. |
| 2016/0098631 A1 | 4/2016 | Osogami et al. |
| 2017/0278018 A1 | 9/2017 | Mnih et al. |

OTHER PUBLICATIONS

Ponulak, Filip, "Supervised Learning in Spiking Neural Networks with ReSuMe Method", Neural Computation, 2010, pp. 14-40 Note: This document was originally an unpublished 2006 dissertation which was made publicly available by 2010, the evidence of which is attached to this document (Year: 2010).*
Osogami et al, "Learning dynamic Boltzmann machines with spike-timing dependent plasticity", Sep. 2015, arxiv.org/, all pages (Year: 2015).*

(Continued)

*Primary Examiner* — Daniel C Puentes
(74) *Attorney, Agent, or Firm* — Tutunjian & Bitetto, P.C.; Randall Bluestone

(57) ABSTRACT

A computer-implement method and an apparatus are provided for neural network reinforcement learning. The method includes obtaining, by a processor, an action and observation sequence. The method further includes inputting, by the processor, each of a plurality of time frames of the action and observation sequence sequentially into a plurality of input nodes of a neural network. The method also includes updating, by the processor, a plurality of parameters of the neural network by using the neural network to approximate an action-value function of the action and observation sequence.

18 Claims, 6 Drawing Sheets

(56) References Cited

OTHER PUBLICATIONS

Otsuka, et al., "Free-energy-based Reinforcement Learning in a Partially Observable Environment", ESANN 2010 proceedings, European Symposium on Artificial Neural Networks—Computational Intelligence and Machine Learning, Apr. 2010, pp. 541-546.
Sallans, et al., "Reinforcement Learning with Factored States and Actions", Journal of Machine Learning Research 5, Aug. 2004, pp. 1063-1088.
Lewis, F. et al., "Reinforcement Learning and Adaptive Dynamic Programming for Feedback Control", IEEE Circuits and Systems Magazine, 2009, pp. 1-19.
U.S. Office Action issued in U.S. Appl. No. 15/804,747 dated Aug. 6, 2020, pp. 1-34.
Lweis et al., "Reinforcement Learning and Adaptive Dynamic Programming for Feedback Control", 2009 IEEE Circuits and Systems Magazine, Third Quarter 2009, pp. 32-50.
Office Action dated Aug. 6, 2020 for U.S. Appl. No. 15/804,747, 34 pages.

\* cited by examiner

നEURAL NETWORK REINFORCEMENT LEARNING

BACKGROUND

Technical Field

The present invention relates to reinforcement learning with a neural network, and, in particular, to reinforcement learning with a neural network modelling a Partially Observable Markov Decision Process (POMDP).

Description of the Related Art

One of the major challenges for Reinforcement Learning (RL) is to learn near optimal policies in high-dimensional state or action spaces, especially when there is non-Markovian or partially observable state space. There has been recent progress in learning human level control policies on different Atari® games or even tackle the high-dimensional state, action space for the game of Go. However, most of these are suitable for Markovian environments and have very limited memory unless coupled with additional recurrent networks.

Previous work on energy-based RL has been mainly focused on Restricted Boltzmann Machines (RBMs), where the action-value function is approximated by the negative free energy of an RBM and trained using TD-learning. However, due to the hidden layer of RBMs, this amounts to TD-learning with a non-linear value function. Non-linear TD learning, however, is known to diverge in theory and is highly unstable in practice. Furthermore, these methods cannot directly deal with POMDP problems requiring memory of past actions and observations.

SUMMARY

According to an aspect of the present invention, a computer program product is provided for neural network reinforcement learning. The computer program product includes a non-transitory computer readable storage medium having program instructions embodied therewith. The program instructions are executable by a computer to cause the computer to perform a method. The method includes obtaining, by a processor, an action and observation sequence. The method further includes inputting, by the processor, each of a plurality of time frames of the action and observation sequence sequentially into a plurality of input nodes of a neural network. The method also includes updating, by the processor, a plurality of parameters of the neural network by using the neural network to approximate an action-value function of the action and observation sequence.

According to another aspect of the present invention, a computer-implemented method is provided. The method includes obtaining, by a processor, an action and observation sequence. The method further includes inputting, by the processor, each of a plurality of time frames of the action and observation sequence sequentially into a plurality of input nodes of a neural network. The method also includes updating, by the processor, a plurality of parameters of the neural network by using the neural network to approximate a function for determining a subsequent action based on the action and observation sequence.

According to yet another aspect of the present invention, an apparatus is provided. The apparatus includes a processor. The processor is configured to obtain an action and observation sequence. The processor is further configured to input each of a plurality of time frames of the action and observation sequence sequentially into a plurality of input nodes of a neural network. The processor is also configured to update a plurality of parameters of the neural network by using the neural network to approximate a function for determining a subsequent action based on the action and observation sequence.

These and other features and advantages will become apparent from the following detailed description of illustrative embodiments thereof, which is to be read in connection with the accompanying drawings.

BRIEF DESCRIPTION OF THE DRAWINGS

The following description will provide detail of preferred embodiments with reference to the following figures wherein.

DETAILED DESCRIPTION

Figure 1:
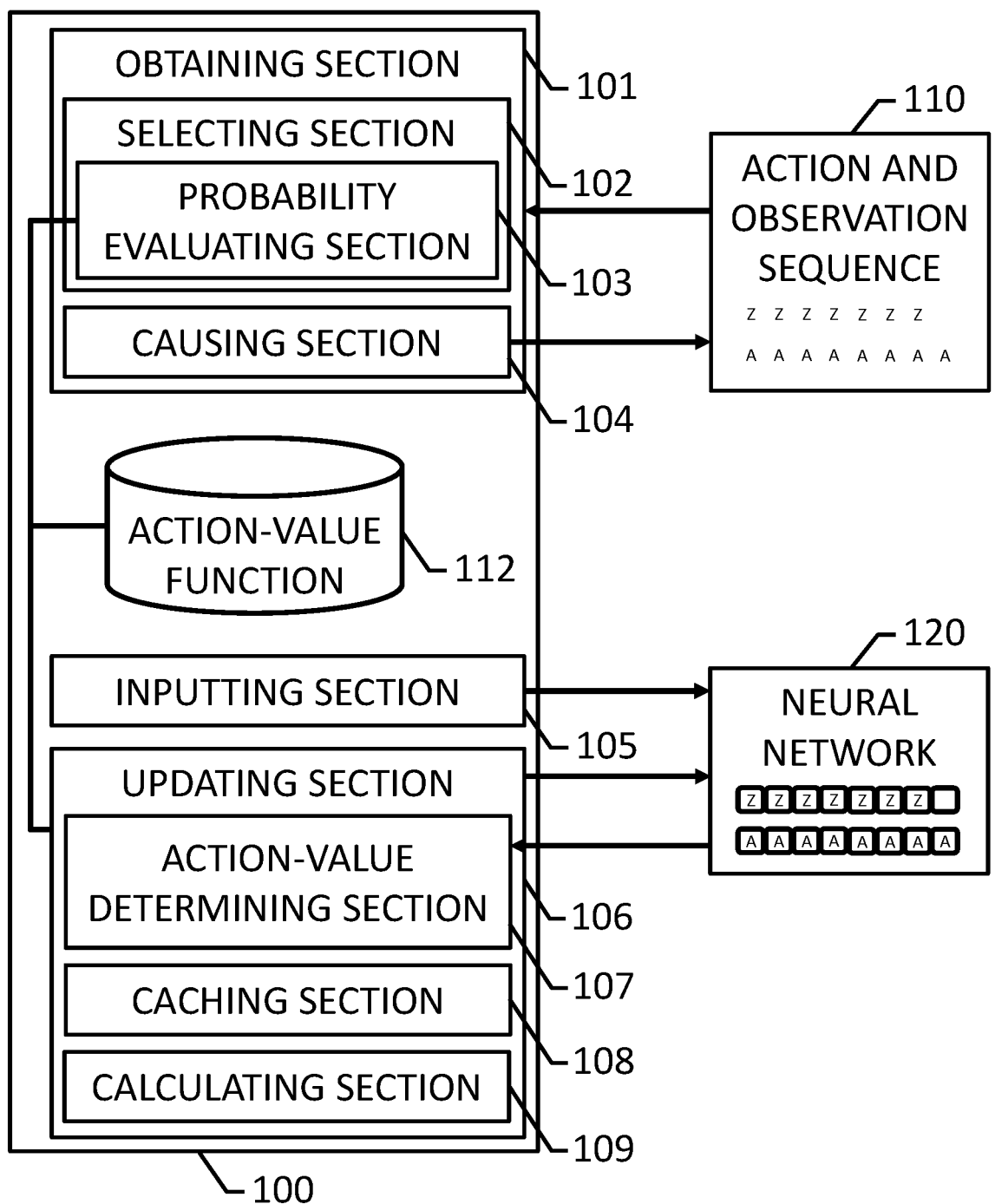
FIG. 1 shows an apparatus for neural network reinforcement learning, according to an embodiment of the present invention.

Hereinafter, example embodiments of the present invention will be described. The example embodiments shall not limit the invention according to the claims, and the combinations of the features described in the embodiments are not necessarily essential to the invention.

Embodiments of the present invention may perform reinforcement learning on a neural network, such as neural networks adapted for a POMDP.

The recently introduced Dynamic Boltzmann Machine (DyBM) provides a particularly structured Boltzmann Machine (BM), as a generative model of multi-dimensional time-series. This BM can have infinitely many layers of units but allows exact interference and learning based on Spike Timing Dependent Plasticity (STDP). Embodiments of the present invention may extend the original DyBM to reinforcement learning problems by including a novel Temporal-Difference (TD) modulated STDP rule for learning with DyBMs that may effectively deal with high dimensional action spaces, and may also solve Partially Observable Markov Decision Process (POMDP) tasks. Using the energy of a DyBM in order to approximate an action-value Q-function, near optimal policy control may be achieved. Value functions may be parameterized using free-energy-based models, trained using non-linear TD-learning. While previous methods were prone to divergence due to non-linear TD, the energy function in a DyBM is linear with respect to its parameters and may theoretically guarantee convergence in the limit of a sufficiently large exploration. Algorithms using energy-based spike timing TD-learning may converge to near-optimal solutions, and may outperform previous energy-based methods.

Embodiments for RL using energy-based policies may utilize TD-learning with a linear value function, thus not suffering from divergence issues. Specific embodiments may employ TD-learning called DySARSA using the architecture of DyBM, which was proposed as a generative model of a high-dimensional time-series. Embodiments may use the energy of a DyBM to approximate an action-value function Q, and learn near-optimal policies with Boltzmann exploration. DyBM may be made very deep by unfolding through time, allowing infinitely many layers. In embodiments having a DyBM with no hidden units, the energy function of a DyBM may be linear in its parameters, and DySARSA may not suffer from divergence issues. In some embodiments, DyBM may be viewed as a fully connected Recurrent Neural Network (RNN) with memory units and with conduction delays between units in the form of First-in First-Out (FIFO) queues that can store long temporal history of inputs. This architecture may enable the DySARSA algorithm to make use of the long memory of prior actions and observations in order to learn optimal policies in POMDP scenarios.

A standard DyBM may be motivated by postulates and observations from biological neural networks, such that it may allow exact inference and spike timing dependent learning of its parameters. In some embodiments, using FIFO queues and a formulation of neural, and synaptic eligibility traces, spike timing information may be propagated between units (neurons) in the network. The precise spike timing information may be crucial for learning in biological systems, and this forms one of the motivations for RL inspired by, reward-modulated spiking timing dependent plasticity. Therefore, embodiments may use an energy-based linear TD learning algorithm that can utilize such spike timing information available in a DyBM to solve memory intensive POMDP tasks or with high-dimensional action spaces. Embodiments with DySARSA may converge to near optimal solutions in a reasonably fast time, while outperforming previous RBM based energy methods and RNN-based RL models dealing specifically for POMDPs.

FIG. 1 shows an apparatus 100 for neural network reinforcement learning, according to an embodiment of the present invention. Apparatus 100 may a host computer such as a server computer or a mainframe computer that executes an on-premise application and hosts client computers that use it. Apparatus 100 may be a computer system that includes two or more computers. Alternatively, apparatus 100 may be a personal computer that executes an application for a user of apparatus 100. Apparatus 100 may perform reinforcement learning on a neural network adapted for an action and observation sequence by using the neural network to approximate an action-value function of the action and observation sequence, and updating the parameters of the neural network based on an action-value determined from the action-value function.

Apparatus 100 may include an obtaining section 101, which may include a selecting section 102 including a probability evaluating section 103, and a causing section 104, an inputting section 105, and an updating section 106, which may include an action-value evaluating section 107, a caching section 108, and a calculating section 109. Apparatus 100 may be a computer program product comprising a computer readable storage medium having program instructions embodied therewith, the program instructions executable by a computer to cause the computer to perform the operations of the various sections. Apparatus 100 may alternatively be analog or digital programmable circuitry, or any combination thereof. Apparatus 100 may alternatively be a computer on which the computer program product installed. Apparatus 100 may be composed of physically separated storage or circuitry that interacts through communication.

Apparatus 100 may interact with action and observation sequence 110, which may be a person, a machine, or other object subject to modelling as a POMDP. The observations may be observed through sensors, and actions may be caused through instructions or physical interaction. Action and observation sequence 110 may be represented by a computer program, such as a game, which is bound by a digitally created environment. Such a computer program may be observed, by receiving data output from the program, and actions may be caused by issuing commands to be executed by the computer program.

Obtaining section 101 may receive data from data storage in communication with apparatus 100. For example, obtaining section 101 may be operable to obtain an action and observation sequence, such as action and observation sequence 110. Action and observation sequence 110 may be obtained sequentially as the actions are performed and the observations are observed. For example, obtaining section 101 may be operable to obtain an observation of a subsequent time frame of action and observation sequence 110. Alternatively, obtaining section 101 may be operable to obtain an entire action and observation sequence for a set of time frames, such as a training sequence, complete with actions and observations at each time frame. Obtaining section 101 may communicate directly with such data stores, or may utilize a transceiver to communicate with a computer through wired or wireless communication across a network.

Selecting section 102 may select an action. For example, selecting section 102 may be operable to select an action with which to proceed from a current time frame of the action and observation sequence to a subsequent time frame of action and observation sequence 110.

Probability evaluation section 103 may evaluate a reward probability of a possible action. For example probability evaluating section 103 may be operable to evaluate each reward probability of a plurality of possible actions according to a probability function based on action-value function, such as action-value function 112. In many embodiments, selected section 102 may select the possible action that yields the largest reward probability from the probability function.

Causing section 104 may cause an action to be performed. For example, causing section 104 may be operable to cause the action selected by selecting section 102 to be performed in the subsequent time frame of action and observation sequence 110.

Inputting section 105 may input values into input nodes of a neural network. For example, inputting section 105 may be operable to input each time frame of action and observation sequence 110 sequentially into a plurality of input nodes of a neural network, such as neural network 120.

Updating section 106 may update the parameters of a neural network, such as neural network 120. For example, updating section 106 may update a plurality of parameters a neural network 120 by using neural network 120 to approximate action-value function 112 based on action and observation sequence 110.

Action-value determining section 107 may determine an action-value. For example, action-value determining section 107 may be operable to determine a current action-value from an evaluation of action-value function 112 in consideration of an actual reward.

Caching section 108 may cache values and parameters for functions and neural networks. For example, caching section 108 may be operable to cache a previous action-value determined for a previous time frame from action-value function 112. Caching section 108 may also be operable to cache parameters of neural network 120, such as eligibility traces, weights, biases, and function parameters for determining such parameters of neural network 120.

Calculating section 109 may calculate parameters. For example, calculating section 109 may be operable to calculate a temporal difference error based on the previous action-value, the current action-value, and the plurality of parameters of neural network 120.

An apparatus, such as apparatus 100, may be useful for DyBM. Apparatus 100 can also be used for any neural network model adapted for an action and observation sequence. A DyBM may be defined from BM having multiple layers of units, where one layer represents the most recent values of a time-series, and the remaining layers represent the historical values of the time-series. The most recent values are conditionally independent of each other given the historical values. It may be equivalent to such a BM having an infinite number of layers, so that the most recent values can depend on the whole history of the time series (see supplementary for DyBM∞). For unsupervised learning, a DyBM may be trained in such a way that the likelihood of a given time-series is maximized with respect to the conditional distribution of the next values given the historical values. Similar to a BM, a DyBM may consist of a network of artificial neurons. In some embodiments using a DyBM, each neuron ay take a binary value, 0 or 1, following a probability distribution that depends on the parameters of the DyBM. In other embodiments using a DyBM, each neuron may take a real value, an integer value, or a multi-value. Unlike the BM, the values of the DyBM can change over time in a way that depends on its previous values. That is, the DyBM may stochastically generate a multi-dimensional series of binary values.

Learning in conventional BMs may be based on a Hebbian formulation, but is often approximated with a sampling based strategy like contrastive divergence. In this formulation, the concept of time is largely missing. In DyBM, like biological networks, learning may be dependent on the timing of spikes. This is called spike-timing; dependent plasticity, or STDP, which means that a synapse is strengthened if the spike of a pre-synaptic neuron precedes the spike of a post-synaptic neuron (Long Term Potentiation—LTP), and the synapse is weakened if the temporal order is reversed (Long Term Depression—LTD). The conventional DyBM may use an exact online learning rule that has the properties of LTP and LTD.

In embodiments of an apparatus in which entire action and observation sequences are obtained at once, such as training sequences, the apparatus may not require a selecting section or a causing section, because the actions are already determined as part of the sequence.

Figure 2:
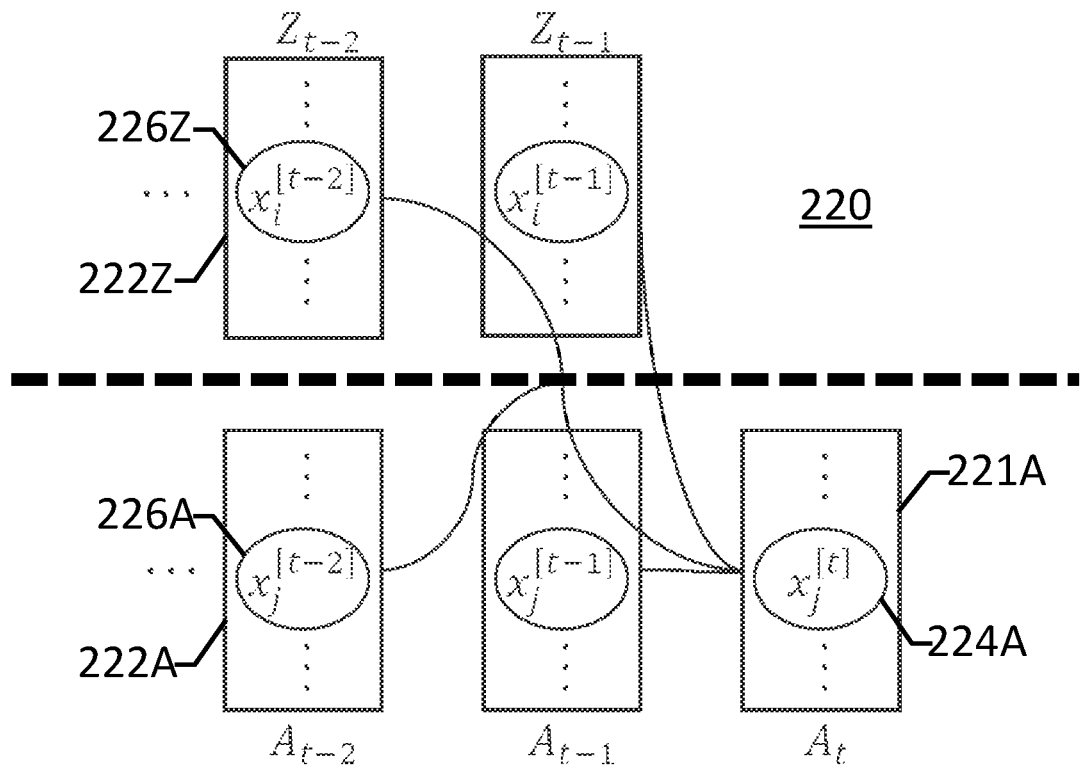
FIG. 2 shows a Dynamic Boltzmann Machine (DyBM) as an example of a neural network, according to an embodiment of the present invention.

FIG. 2 shows a dynamic Boltzmann machine (DyBM) as an example of a neural network, according to an embodiment of the present invention. DyBM 220 may include a plurality of layers of nodes (e.g. layers 221A, 222A1, 222A2, 222Z1, and 222Z2) among a plurality of nodes (e.g. 224A, 226A1, 226A2, 226Z1, and 226Z2). Each layer sequentially forwards input values of a time frame of the action and observation sequence to a subsequent layer among the plurality of layers. The plurality of layers of nodes includes a first layer 221A of input nodes, such as input node 224A, and a plurality of intermediate layers, such as intermediate layer 222A/222Z. In the first layer 221A, the input nodes 224A receive input values representing an action of a current time frame of the action and observation sequence. The plurality of layers of nodes may also include another first layer of other input nodes that receive input values representing an observation of a current time frame of the action and observation sequence.

Each node, such as action node 226A and observation node 226Z, in each intermediate layer forwards a value representing an action or an observation to a node in a subsequent or shared layer. FIG. 2 shows three time frames, t, t−1, and t−2. Each time frame is associated with an action, A, and an observation, Z. The action at time t is represented as $A_t$. The action at time t−1 is represented as $A_{t-1}$, and the action at time t−2 is represented as $A_{t-2}$. The observation at time t−1 is represented as $Z_{t-1}$, and the action at time t−2 is represented as t−2. FIG. 2 does not show an observation at time t, because DyBM 220 is shown at a moment in which action $A_t$ is being determined, but has not been caused. Thus, in this moment, each other node is presynaptic to the nodes of action $A_t$ 221A. Once an action has been selected and caused, DyBM 220 will create input nodes for the observation at time t, $Z_t$, for storing binary numbers representing. In other implementations, observation $Z_1$ at time t can be input to $Z_{t-1}$ after the current values of $Z_{t-1}$, $Z_{t-2}$, . . . are forwarded to $Z_{t-2}$, $Z_{t-3}$, . . . and the current values of $A_{t-1}$, $A_{t-2}$, . . . are forwarded to $A_{t-2}$, $A_{t-3}$, . . .

In FIG. 2, values representing an action A at time t, t−1, t−2, . . . are denoted $x_j^{[t]}$, $x_j^{[t-1]}$, and $x_j^{[t-2]}$, where $j(1 \leq j \leq N_d)$ represents a node number relating to an action and $N_d$ represents a number of values (or nodes) in an action. Values representing an observation Z at time t, t−1, and t−2, . . . are denoted $x_i^{[t]}$, $x_i^{[t-1]}$, $x_i^{[t-2]}$, where $i(1 \leq i \leq N_b)$ represents a node number relating to an observation and $N_b$ represents a number of values (or nodes in an observation.

Each action, A, and each observation, Z, at each time frame of DyBM 220 may be represented as a plurality of binary numbers. For example, if there are 256 possible actions, then each action can be represented as a permutation of 8 binary numerals. Input node 224A is a binary numeral representing the action at time t, and is represented as $x_j^{[t]}$. Action node 226A is a binary numeral representing the action at time t−2, and is represented as $x_j^{[t-2]}$. The action node representing the action at time t−1 is represented as $x_j^{[t-1]}$. Observation node 226Z is a binary numeral representing the observation at time t−2, and is represented as $x_i^{[t-2]}$. The observation node representing the observation at time is represented as $x_i^{[t-1]}$.

Figure 3:
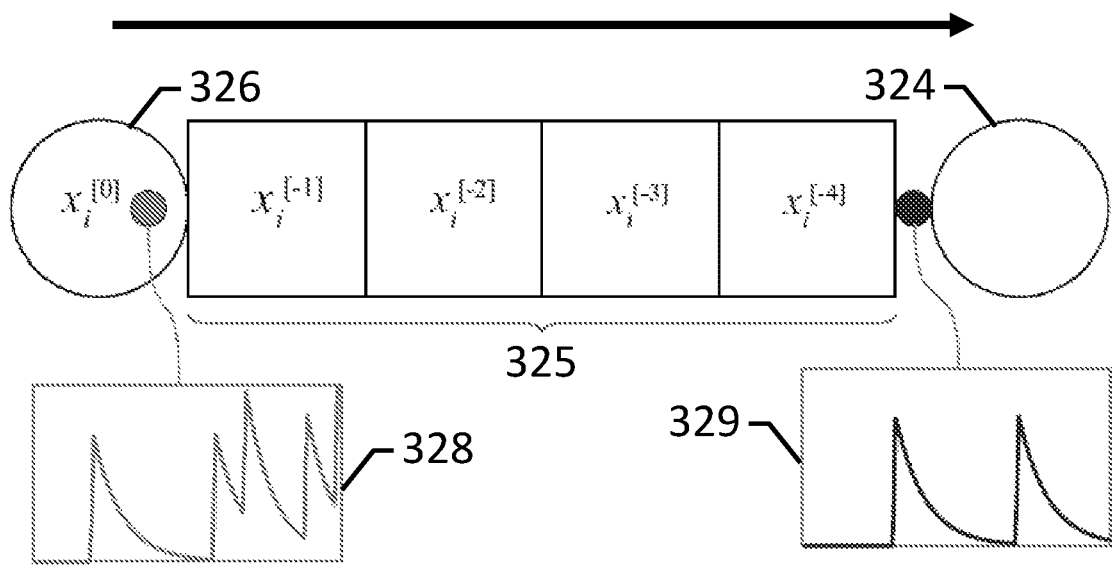
FIG. 3 shows a connection between a presynaptic neuron and a post-synaptic neuron via a FIFO queue, according to an embodiment of the present invention.

DyBM 220 may also include a plurality of weight values among the plurality of parameters of the neural network. Each weight value is to be applied to each value in the corresponding node to obtain a value propagating from a pre-synaptic node to a post-synaptic node, FIG. 3 shows a connection between a presynaptic neuron 326, which has a neural eligibility trace 328, and a post-synaptic neuron 324 via a FIFO queue 325, which has a synaptic eligibility trace 329, according to an embodiment of the present invention. Although the diagram of DyBM 220 shown in FIG. 3 looks different from the diagram of DyBM 220 shown in FIG. 2, these diagrams represent a same or similar structure of DyBM. In FIG. 3, values from nodes $x_j^{[t-1]}$, $x_j^{[t-2]}$, . . . of the same j in FIG. 2 are sequentially stored in a FIFO queue 325 (shown as $x_j^{[t-1]}$, $x_j^{[t-2]}$, . . . ) as an implementation of for example, node 226A forwarding a value from the action and observation sequence. In FIG. 3, values from nodes $x_i^{[t-1]}$, $x_i^{[t-2]}$, . . . of the same i in FIG. 2 are also sequentially stored in a FIFO queue 325 assigned to another i in FIG. 3 corresponding to an i in FIG. 3.

In FIG. 3, DyBM 220 may consist of a set of neurons having memory units and FIFO queues. Let N be the number of neurons. Each neuron may take a binary value at each moment. For $j \in [1, N]$, let $x_j^{[t]}$ be the value of the j-th neuron at time t.

A neuron, $i \in [1, N]$, may be connected to another neuron, $j \in [1, N]$, with a FIFO queue of length $d_{i,j}-1$, where $d_{i,j}$ is the axonal or synaptic delay of conductance, or conduction delay, from the pre-synaptic neuron, i, to the post-synaptic neuron, j. Please note that the usage of i and j in FIG. 3 is different from that of FIG. 2, since the above usage is more convenient to explain the diagram of FIG. 3. We assume $d_{i,j} \geq 1$. At each moment t, the tail of the FIFO queue holds $x_i^{[t-1]}$, the head of the FIFO queue holds $x_i^{[t-d_{i,j}+1]}$. A simile increment in time causes the value at the head of the FIFO queue to be removed, and the remaining values in the FIFO queues are pushed toward the head by one position. A new value is then inserted at the tail of the FIFO queue. Self-connections via a FIFO queue are permitted.

Each neuron stores a fixed number, L, of neural eligibility traces. For $l \in [1, L]$ and $j \in [1, N]$, let $\gamma_{j,l}^{[t-1]}$ be the l-th neural eligibility trace of the j-th neuron immediately before time t:

$$\gamma_{j,l}^{[t-1]} \equiv \Sigma_{s=-\infty}^{t-1} \mu_l^{t-s} x_j^{[s]},\qquad\text{Eq. (1)}$$

where $\mu_l \in (0,1)$ is the decay rate for the l-th neural elegibility trace, i.e. the neural eligibility trace is the weighted sum of the past values of that neuron, where the recent values have greater weight than the others.

Each neuron may also store synaptic eligibility traces, where the number of the synaptic eligibility traces depends on the number of the neurons that are connected to that neuron. Namely, for each of the (pre-synaptic) neurons that are connected to a (post-synaptic) neuron j, the neuron j stores a fixed number, K, of synaptic elegibility traces. For $k \in [1,K]$, let $\alpha_{i,j,k}^{[t-1]}$ be the k-th synaptic eligibility trace of the neuron j for the pre-synaptic neuron i immediately before time t:

$$\alpha_{i,j,k}^{[t-1]} \equiv \Sigma_{s=-\infty}^{t-d_{i,j}} \lambda_k^{t-s-d_{i,j}} x_i^{[s]},\qquad\text{Eq. (2)}$$

where $\lambda_k \in (0,1)$ is the decay rate for the k-th synaptic eligibility traces, i.e. the synaptic eligibility trace is the weighted sum of the values that has reached that neuron, j, from a pre-synaptic neuron, i, after the conduction delay, $d_{i,j}$.

The values of the eligibility traces stored at a neuron, j, are updated locally at time i based on the value of that neuron, j, at time t and the values that have reached that neuron, j, at time t from its pre-synaptic neurons. Specifically, $$\gamma_{j,l}^{[t]} \leftarrow \mu_l(\gamma_{j,l}^{[t-1]} + x_j^{[t]}),\qquad\text{Eq. (3)}$$

$$\alpha_{i,j,k}^{[t]} \leftarrow \lambda_k(\alpha_{i,j,k}^{[t-1]} + x_i^{t-d_{i,j}}),\qquad\text{Eq. (4)}$$

for $l \in [1, L]$ and $k \in [1, K]$, and for neurons i that are connected to j.

The learnable parameters of DyBM 220 are bias and weight. Specifically, each neuron, j, is associated with bias, k. Each synapse, or each pair of neurons that are connected via a FIFO queue, is associated with the weight of long term potentiation (LTP weight) and the weight of long term depression (LTD weight). The LTP weight from a (pre-synaptic) neuron, i, to a (post-synaptic) neuron, j, is characterized with K parameters, $u_{i,j,k}$ for $k \in [1, K]$. The k-th LTP weight corresponds to the k-th synaptic eligibility trace for $k \in [1, K]$. The LTD weight from a (pre-synaptic) neuron, i, to a (post-synaptic) neuron, j, is characterized with L parameters, $v_{i,j,l}$ for $l \in [1, L]$. The l-th LTD weight corresponds to the l-th neural eligibility trace for $l \in [1, L]$. The learnable parameters are collectively denoted with θ.

Similar to the conventional BM, the energy of DyBM 220 determines what patterns of the values that DyBM 220 is more likely to generate than others. Contrary to the conventional BM, the energy associated with a pattern at a moment depends on the patterns that DyBM 220 has previously generated. Let $x^{[t]} = (x_j^{[t]})_{j \in [1,N]}$ be the vector of the values of the neurons at time t. Let $x^{[:t-1]} = (x^{[s]})_{s<t}$ be the sequence of the values of DyBM 220 before time t. The energy of DyBM 220 at time t depends not only on $x^{[t]}$ but also on $x^{[:t-1]}$, which is stored as eligibility traces in DyBM 220. Let $E_\theta(x^{[t]}|x^{[:t-1]})$ be the energy of DyBM 220 at time t. The lower the energy of DyBM 220 with particular values $x^{[t]}$, the more likely DyBM 220 takes those values. The energy of DyBM 220 can be decomposed into the energy of each neuron at time t:

$$E_\theta(x^{[t]}|x^{[:t-1]}) = \Sigma_{j=1}^N E_\theta(x^{[t]}|x^{[:t-1]}),\qquad\text{Eq. (5)}$$

The energy of the neuron j at time i depends on the value it takes as follows (see supplementary for explanation of the individual components):

$$E_\theta(x^{[t]}|x^{[:t-1]}) = -b_j x_j^{[t]} - \Sigma_{i=1}^N \Sigma_{k=1}^K u_{i,j,k} \alpha_{i,j,k}^{[t-1]} x_j^{[t]} + \Sigma_{i=1}^N \Sigma_{l=1}^L v_{i,j,l} \beta_{i,j,l}^{[t-1]} x_j^{[t]} + \Sigma_{i=1}^N \Sigma_{l=1}^L v_{j,i,l} \gamma_{i,l}^{[t-1]} x_i^{[s]},\qquad\text{Eq. (6)}$$

where $u_{i,j,k}$ and $v_{i,j,l}$ are weights, and $$\beta_{i,j,l}^{[t-1]} x_j^{[t]} \equiv \Sigma_{s=t-d_{i,j}+1}^{t-1} \mu_l^{s-t} x_i^{[s]}.\qquad\text{Eq. (7)}$$

To perform reinforcement learning with SARSA for a POMDP using DyBM 220, we divide the set of nodes (neurons) into two groups. One group represents actions and is denoted by A. The other represents observations and is denoted by Z. That is, an action that we take at time t is denoted by a vector $x_A^{[t]} \equiv (x_j^{[t]})_{j \in A}$, and the observation that we make immediately after we take that action is analogously denoted by $x_Z^{[t]}$. The pair of the action and the observation at time t is denoted by $x \equiv (x_j^{[t]})_{j \in A \cup Z}$. Here, an observation can include the information about the reward that we receive, if the past reward affect What actions will be optimal in the fixture. The actions that we take are certainly observable, but we separate the action from observation for convenience.

In some embodiments, it is also possible to predict values of an observation $Z_t$ once an action $A_t$ has been fixed in the neural network. In this case, values $x_i^{[t]}$ in $Z_t$ can also be predicted, and works as an input layer including input nodes $x_i^{[t]}$. In further embodiments, all of the values $x_i^{[t]}$ and $x_j^{[t]}$ of both $Z_t$ and $A_t$ may be predicted.

DyBM exhibits some of the key properties of STDP due to its structure consisting, of conduction delays, such as pre-synaptic neuron 326, and memory units, such as FIFO queue 325. A neuron may be connected to another in a way that a spike from pre-synaptic neuron 326, i, travels along an axon and reaches pest-synaptic neuron 324, j, via a synapse after a delay consisting of a constant period, $d_{i,j}$. FIFO queue 325 causes the conduction delay. FIFO queue 325 may store the values of pre-synaptic neuron 326 for the last $d_{i,j}-1$ units of time. Each stored value may be pushed one position toward the head of the queue when the time is incremented by one unit. The value of pre-synaptic neuron 326 is thus given to post-synaptic neuron 324 after the conduction delay. Moreover, the DyBM aggregates information about the spikes in the past into neural eligibility trace 328 and synaptic eligibility trace 329, which are stored in the memory units. Each neuron is associated with a learnable parameter called bias. The strength of the synapse between pre-synaptic neuron 326 and post-synaptic neuron 324 is represented by learnable parameters called weights, which may be further divided into LTP and LTD components.

Figure 4:
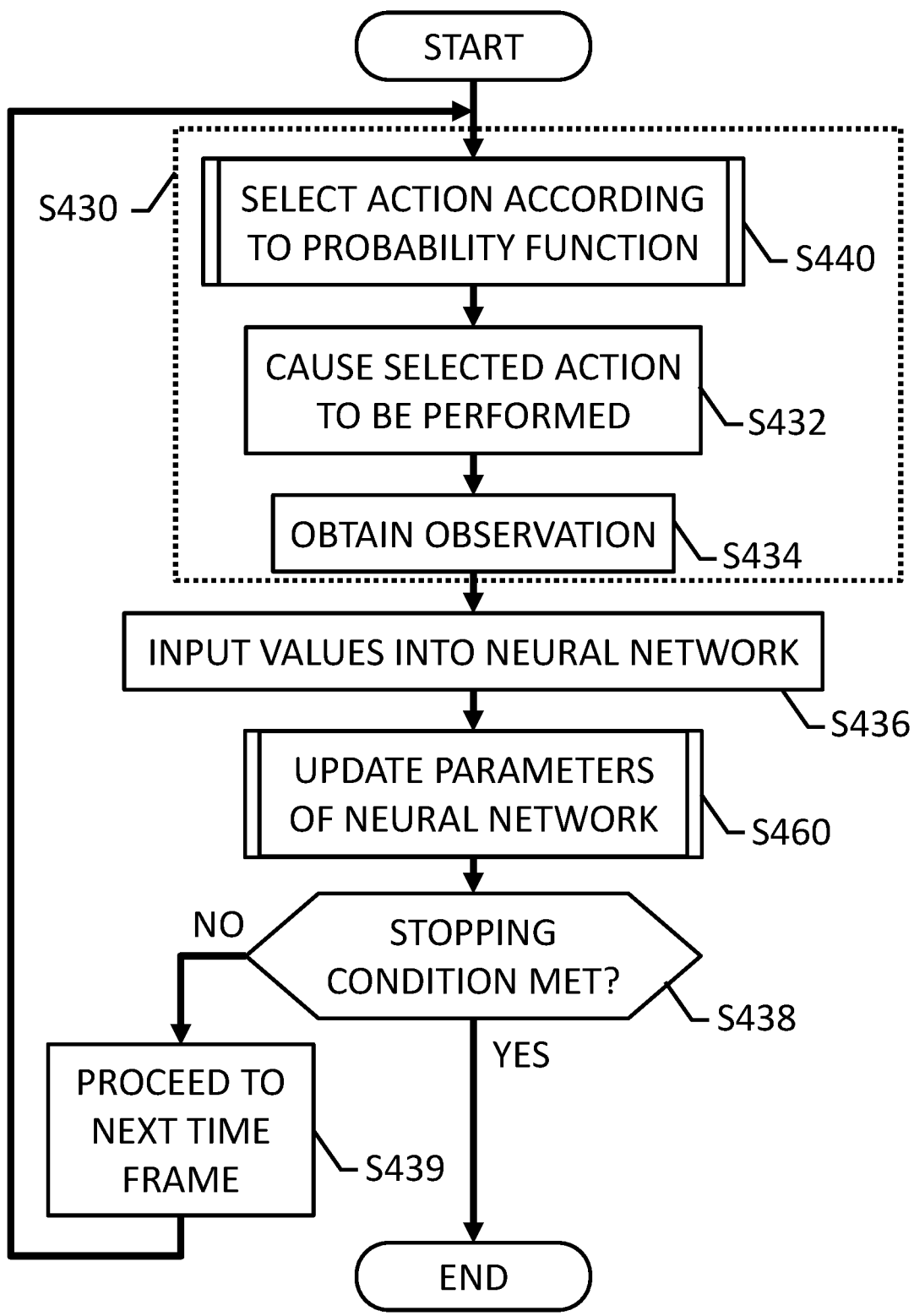
FIG. 4 shows an operational flow for neural network reinforcement learning, according to an embodiment of the present invention.

FIG. 4 shows an operational flow for neural network reinforcement learning, according to an embodiment of the present invention. The operational flow may provide a method of perform reinforcement learning on a neural network adapted for an action and observation sequence, such as a DyBM. The operations may be performed by an apparatus, such as apparatus 100.

At S430, an obtaining section, such as obtaining section 101, may obtain an action and observation sequence. More specifically, as the operational flow of FIG. 4 is iteratively performed, the iterations of the operations of S430 collectively amount to an operation of obtaining the action and observation sequence. Operation S430 may include operations S440, S432, and S434. Alternatively at S430, the obtaining, section may obtain an entire action and observation sequence for a set of time frames, such as a training sequence, complete with actions and observations at each time frame.

At S440, a selecting section, such as selecting section 102, may select an action according to a probability function. For example, the selecting section may select an action with which to proceed from a current time frame of the action and observation sequence to a subsequent time frame of the action and observation sequence.

At S432, a causing section, such as causing section 104, may cause the selected action to be performed. For example, the causing section may cause the action selected at S440 to be performed in the subsequent time frame of the action and observation sequence. Depending on the nature of the action and observation sequence, actions may be caused through instructions or physical interaction, such as in the case of a human or machine, in which case the actions may be performed by the human or the machine, or caused by issuing commands to be executed by the computer program, in which case the actions are performed by the computer program.

At S434, the obtaining section may obtain an observation. For example, the obtaining section may obtain an observation of the subsequent time frame of the action and observation sequence. Once the selected action has been performed, certain observations can be sensed, detected, measured, or otherwise received by the obtaining section. The setting of reinforcement learning may be where a (Markovian) state cannot be observed (i.e., our setting is modeled as a partially observable Markov decision process or POMDP). If such a state was observable, a policy that maps a state to an action could be sought, because the future would become conditionally independent of the past given the state. In a partially observable state setting, the optimal policy may depend on the entire history of prior observations and actions, which are represented as $x_i^{[t-n]}$ in FIG. 2. In some embodiments, the observation obtained may also include or be accompanied by an actual reward, which may reduce the number of time frames required for convergence, but may also require more computational resources. The actual reward may be a supplied through conscious feedback, such as in indication by a person, or calculated from, for example, a final state, and is therefore assumed to be factual.

At S436 an input section, such as input section 105, may input values corresponding to the current time frame into a neural network. As the operational flow of FIG. 4 is iteratively performed, the iterations of the operations of S436 collectively amount to, the input section inputting each time frame of the action and observation sequence sequentially into a plurality of input nodes of a neural network, such as the DyBM.

At S460, an updating section, such as updating section 106, may update parameters of a neural network. For example, the updating section may update a plurality of parameters of the neural network hey using the neural network to approximate an action-value function based the action and observation sequence. By updating the parameters of the neural network, the approximation of the action-value function may become more accurate, which may in turn improve the accuracy of the probability function. Inch may result in the selection of actions that more efficiently achieve goals.

At S438, the apparatus may determine whether a stopping condition is met. If the stopping condition is met, such as if a maximum number of iterations have been performed, then the operational flow is discontinued. If the stopping condition is not met, such as if a maximum number of iterations have not yet been performed, then the operational flow proceeds to S439.

At S439, the apparatus proceeds to the next time frame, and the operational flow returns to operation S430 to perform the next iteration. In the next iteration, the current time frame becomes a previous time frame, and the subsequent time frame becomes the current time frame.

In other embodiments of an operational flow for neural network reinforcement learning, the updating section may update the par meters of the neural network every other iteration, every third iteration, and so on. The number of iterations before performing an update may change, and/or may depend on the rewards.

In embodiments of operational flow for neural network reinforcement learning in which entire action and observation sequences are obtained at once, such as training sequences, the operational flow may not require a selecting operation or a causing operation, because the actions are already determined as part of the sequence. In further embodiments, such training sequences may be run through the operational flow multiple times and combined with different training sequences to train a neural network.

Figure 5:
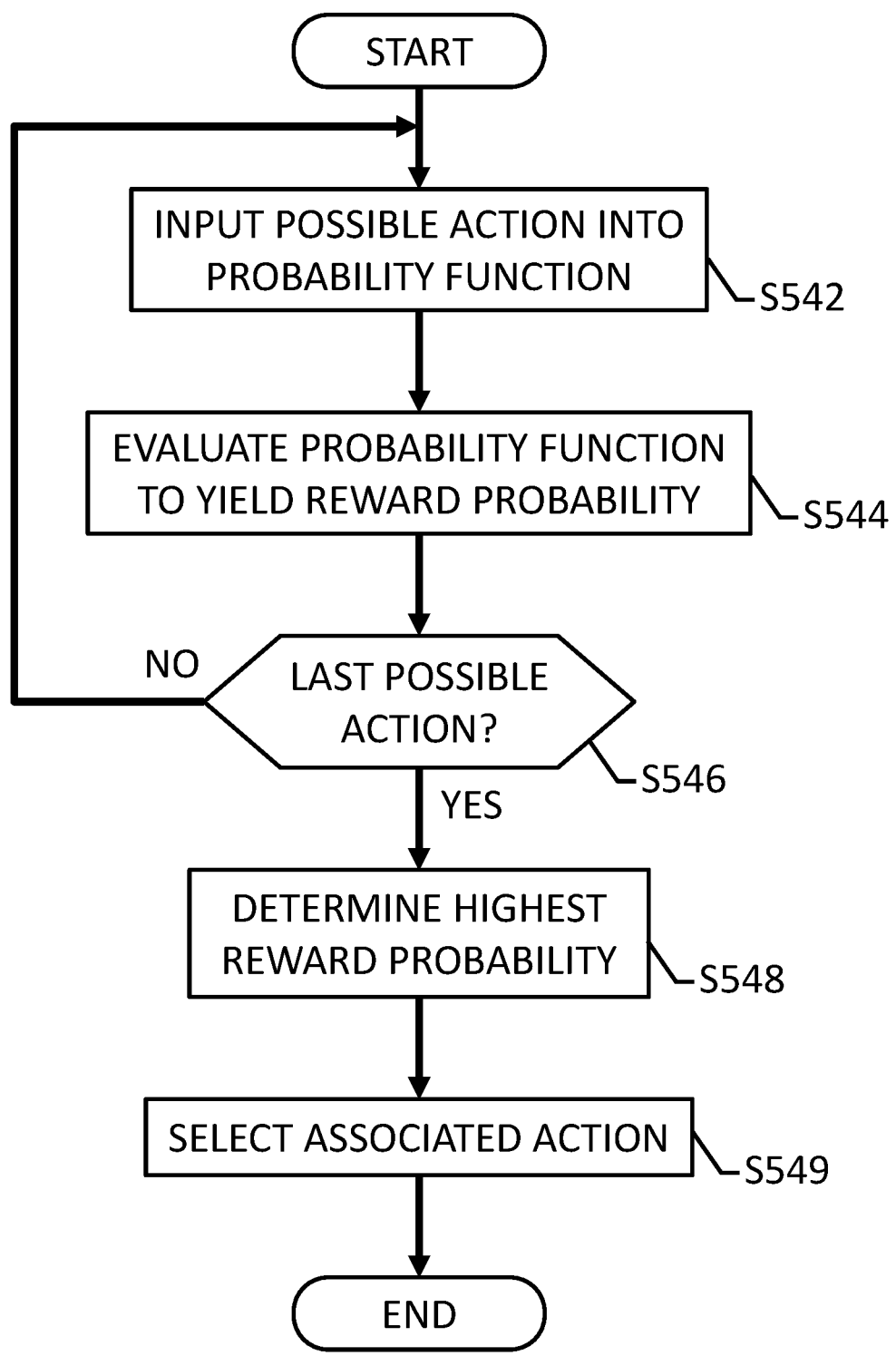
FIG. 5 shows an opera oral flow for selecting a possible action, according to an embodiment of the present invention.

FIG. 5 shows an operational flow for selecting a possible action, according to an embodiment of the present invention. The operational flow ma provide a method of selecting an action according to a probability function. The operations may be performed by an apparatus, such as apparatus 100.

At S542, a selecting section, such as selecting section 102, may input a possible action into, a probability function. For example, out of all possible actions, a single possible action is input into the probability function. Once the possible action is input into the probability function, the selecting section may make an indication, such as by updating a pointer, so that the same possible action is not input into the probability function twice in a single time frame. In embodiments where the neural network is a DyBM, as shown in FIG. 2, each permutation of binary action input nodes $x_j^{[t]}$ may represent a possible action.

At S544, a probability evaluating, section, such as probability evaluating section 103, may evaluate the probability function to yield a reward probability, or the probability that a possible action will result in receiving a reward. As operations S542 and S544 are iteratively performed, the selecting section evaluates each reward probability of a plurality of possible actions according to the probability function based on the action-value function.

At S546, the selecting section may determine whether any unevaluated possible actions remain. If the last possible action has not yet been evaluated, then the operational flow returns to S542. If the last possible action has been evaluated, then the operational flow proceeds to S548.

At S548, the selecting section may determine the highest reward probability that was yielded from the evaluations performed by the probability evaluating section at S544.

At S549, the selecting section may select the possible action that is associated with the highest reward probability determined at S548. In other words, the selected action among the plurality of possible actions yields the largest reward probability from the probability function. Once the possible action has been selected, the operational flow proceeds to cause the selected action, such as S432 in FIG. 4, to be performed.

In alternative embodiments of an operational flow for selecting a possible action, each node of the action may be evaluated individually. Because the value of each node is not affected by the values of other nodes, an operation can determine each Action node individually. When all nodes have been determined individually, the action represented by result of each node is the selected action.

Figure 6:
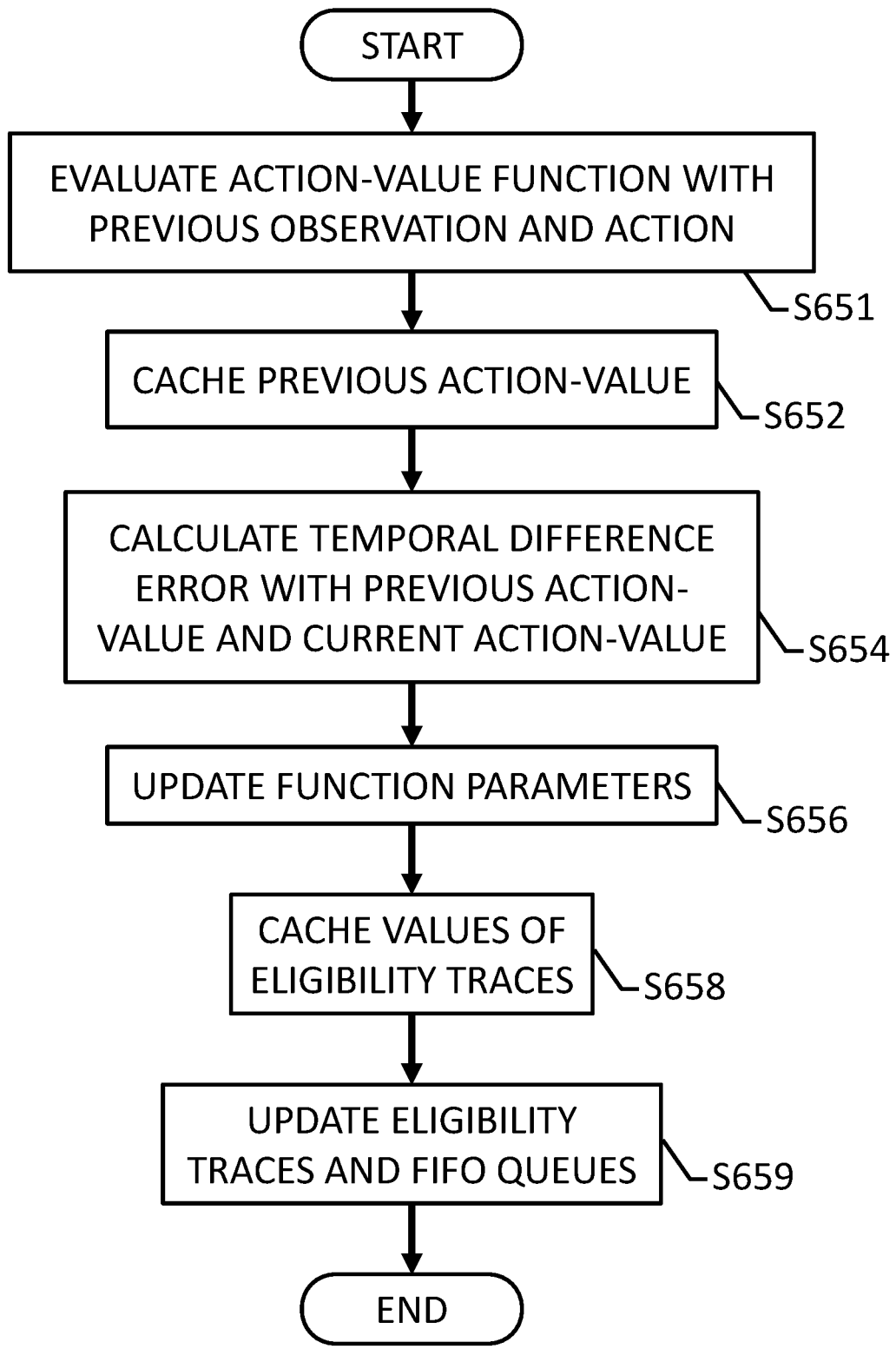
FIG. 6 shows an operational flow for updating the parameters of a neural network, according to an embodiment of the present invention.

FIG. 6 shows an operational flow for updating the parameters of a neural network, according to an embodiment of the present invention. The operational flow may provide a method of updating parameters of a neural network. The operations may be performed by an apparatus, such as apparatus 100. Before showing the operational flow shown in FIG. 6, underlying theory is explained below.

An approach for reinforcement learning is called SARSA, which refers to a general class of on-policy TD-learning methods for RL. SARSA stand for State-Action-Reward-State-Action, as a representation of its formula. SARSA updates an action-value function Q according to $$Q(S_t,A_t) \leftarrow Q(S_t,A_t) + \eta(R_{t+1} + \gamma Q(S_{t+1},A_{t+1}) - Q(S_t,A_t)), \quad \text{Eq. (8)}$$

where $S_t$ is the (Markovian and observable) state at time t, $A_t$ is the action that we take at time t, $R_{t+1}$ is the reward that we receive after taking $A_t$, $\gamma$ is the discount factor for future reward, and t is the learning rate. In our case, the Markovian state is not observable, and $S_t$ refers to the entire history of observations and actions before t (i.e., $S_t = X^{[:t-1]}$).

In some embodiments, the action-value function may be an energy function of the neural network. By Eq. (5), the energy of a DyBM having the structure in FIG. 2 can be decomposed into a sum of the energy associated with its individual nodes as follows:

$$E_\theta(x^{[t]}|x^{[:t-1]}) = \Sigma_{j \in A \cup Z} E_\theta(x_j^{[t]}|x^{[:t-1]}), \quad \text{Eq. (9)}$$

Here, the energy associated with the nodes is used for the action to approximate the Q-function:

$$Q(x^{[:t-1]},x_A^{[t]}) = -\Sigma_{j \in A} E_\theta(x_j^{[t]}|x^{[:t-1]}), \quad \text{Eq. (10)}$$

where $E_\theta(x_j^{[t]}|x^{[:t-1]})$ is given by Eq. (6). Recall that $\alpha_{i,j,k}^{[t-1]}, \beta_{i,j,l}^{[t-1]}$, and $\gamma_{i,l}^{[t-1]}$ in Eq. (6) are updated at each time step using Eqs. (3), (4), and (7).

In other embodiments, the action-value function is a linear function. In many embodiments, such as embodiments where the neural network is a DyBM, the action-value function is a linear energy function of the neural network. The approximate Q-function Eq. (10) is lineal, with respect to the parameters of the DyBM. This is in contrast to ESARSA where the free-energy of a Restricted Boltzmann Machine (RBM) is used to approximate the Q-function. Due to the hidden nodes in an RBM, this is a non-linear function approximation method, which may diverge in theory and practice. However, convergence of SARSA with a linear function approximation is guaranteed under suitable conditions.

When the Q-function is approximated with a linear function of parameters, $\theta$, such that:

$$Q_\theta(S,A) = \phi(S,A)^T \theta, \quad \text{Eq. (11)}$$

SARSA learning rule is given by $$\theta_{t+1} = \theta_t + \eta_t \Delta_t \phi(S_t,A_t), \quad \text{Eq. (12)}$$

where $\eta_t$ is a learning rate, and $\Delta_t$ is a TD error:

$$\Delta_t = R_{t+1} + \gamma \phi(S_{t+1},A_{t+1})^T \theta_t - \phi(S_t,A_t)^T \theta_t, \quad \text{Eq. (13)}$$

In our case, the exact DySARSA learning rule is $\forall j \in A$, $\forall i \in A \cup S$, k=1, ..., K, l=1, ..., L $$b_j \leftarrow b_j + \eta_t \Delta_t x_j^{[t]} \quad \text{Eq. (14)}$$

$$u_{i,j,k} \leftarrow u_{i,j,k} + \eta_t \Delta_t \alpha_{i,j,k}^{[t-1]} x_j^{[t]} \quad \text{Eq. (15)}$$

$$v_{i,j,l} \leftarrow v_{i,j,l} + \eta_t \Delta_t \beta_{i,j,l}^{[t-1]} x_j^{[t]} \quad \text{Eq. (16)}$$

$$v_{i,j,l} \leftarrow v_{i,j,l} + \eta_t \Delta_t \gamma_{i,l}^{[t-1]} x_j^{[t]}, \quad \text{Eq. (17)}$$

where the TD error is given by $$\Delta_t = R_t + \gamma Q_{\theta_t}(x^{[:t]},x_A^{[t+1]}) - Q_{\theta_{t-1}}(x^{[:t-1]},x_A^{[t]}). \quad \text{Eq. (18)}$$

Each is duplicated in Eq. (16) and Eq. (17) and thus updated twice in each step. This is just for notational convenience, and the two could be merged.

SARSA allows selection of a subsequent action on, the basis of the values of Q for candidate actions. Therefore, actions are selected based on the policy with Boltzmann exploration. Boltzmann exploration is particularly suitable for DyBM because Eq. (10) allows us to sample each bit of an action (i.e., $x_j^{[t]}$ j $\in$ A) independently of each other according to the following:

$$Pr(x_j^{[t]} = 1) = \frac{1}{1 + \exp(\tau^{-1} E_\theta(x_j^{[t]} = 1 | x^{[:t-1]}))}, \quad \text{Eq. (19)}$$

where $\tau > 0$ is the parameter representing temperature, and $\tau \to 0$ leads to a greedy policy. Operation S544 may use Eq. (19) as the probability function. Notice that the energy is 0 when $x_j^{[t]} = 0$. In this case, DySARSA converges as long as it is weedy in the limit of infinite exploration. Furthermore, recall that the neural and synaptic eligibility traces along with the FIFO queues store the spike timing history in DyBM. As such, the DySARSA learning rule of (Eqs. (14)-(17)) can be viewed as analogous to a possible biological counterpart in the form of reward or TD-error modulated reinforcement teaming.

Overall the DySARSA learning algorithm proceeds as in Algorithm 1, where we use vector notations: $\alpha^{[t]} \equiv (\alpha_{i,j,k}^{[t]})_{i,j \in A \cup Z, k \in [1,k]}$; $\beta^{[t]}$ and $\gamma^{[t]}$ are defined analogously.

In some embodiments where the neural network is a DyBM as shown in FIG. 2, the action-value function may be evaluated with respect to nodes of the neural network associated with actions of the action and observation sequence. In other embodiments where the neural network is a DyBM as shown in FIG. 2, the action-value function may be evaluated with respect to nodes of the neural network associated with actions and observations of the action and observation sequence.

The operational flow may begin after an inputting section, such as inputting section 105, inputs values into a neural network.

At S651, an action-value determining section, such as action-value determining section 107, may evaluate an action-value function in consideration of an actual reward to determine an action-value. In other words, the updating the plurality of parameters of the neural network may further include determining a current action-value from an evaluation of the action-value function in consideration of an actual reward. In some embodiments, the previously cached action-value, such as from a time frame t−2, may be deleted.

At S652, a caching section, such as caching, section 108, may cache the action-value determined at a previous iteration of S651. In other words, the updating the plurality of parameters of the neural network may further include caching a previous action-value determined from a previous time frame from the action-value function.

At S654, a calculating section, such as calculating section 109, may calculate a temporal difference (TD) error, which may be based on the action-value determined at S651 and the plurality of parameters of neural network. In other words, the updating the plurality of parameters of the neural network may further include calculating a temporal difference error based on the previous action-value, the current action-value, and the plurality of parameters. The TD-error may be calculated using Eq. (13).

At S656, the updating section may update a plurality of function parameters based on the temporal difference error calculated at S654 and a learning rate. In other words, the updating the plurality of parameters of the neural network includes updating a plurality of function parameters based on the temporal difference error and a learning rate. These function parameters may be updated using Eqs. (14-17).

At S658, the caching section may cache the plurality of function parameters updated at S656, which may be used to determine and update eligibility traces of the neural network. The values of $x^{[t+1]}$, $\alpha^{[t]}$, $\beta^{[t]}$, and $\gamma^{[t]}$ may be updated. In some embodiments, the previous values of $x^{[t+1]}$, $\alpha^{[t]}$, $\beta^{[t]}$, and $\gamma^{[t]}$ may be deleted.

At S659, the updating section may update the eligibility traces and any FIFO queues of the neural network. In other words the updating the plurality of parameters of the neural network includes updating a plurality of eligibility traces and a plurality of first-in-first-out (FIFO) queues. The eligibility traces and FIFO queues may be updated with Eqs. (3, 4, and 7)

Figure 7:
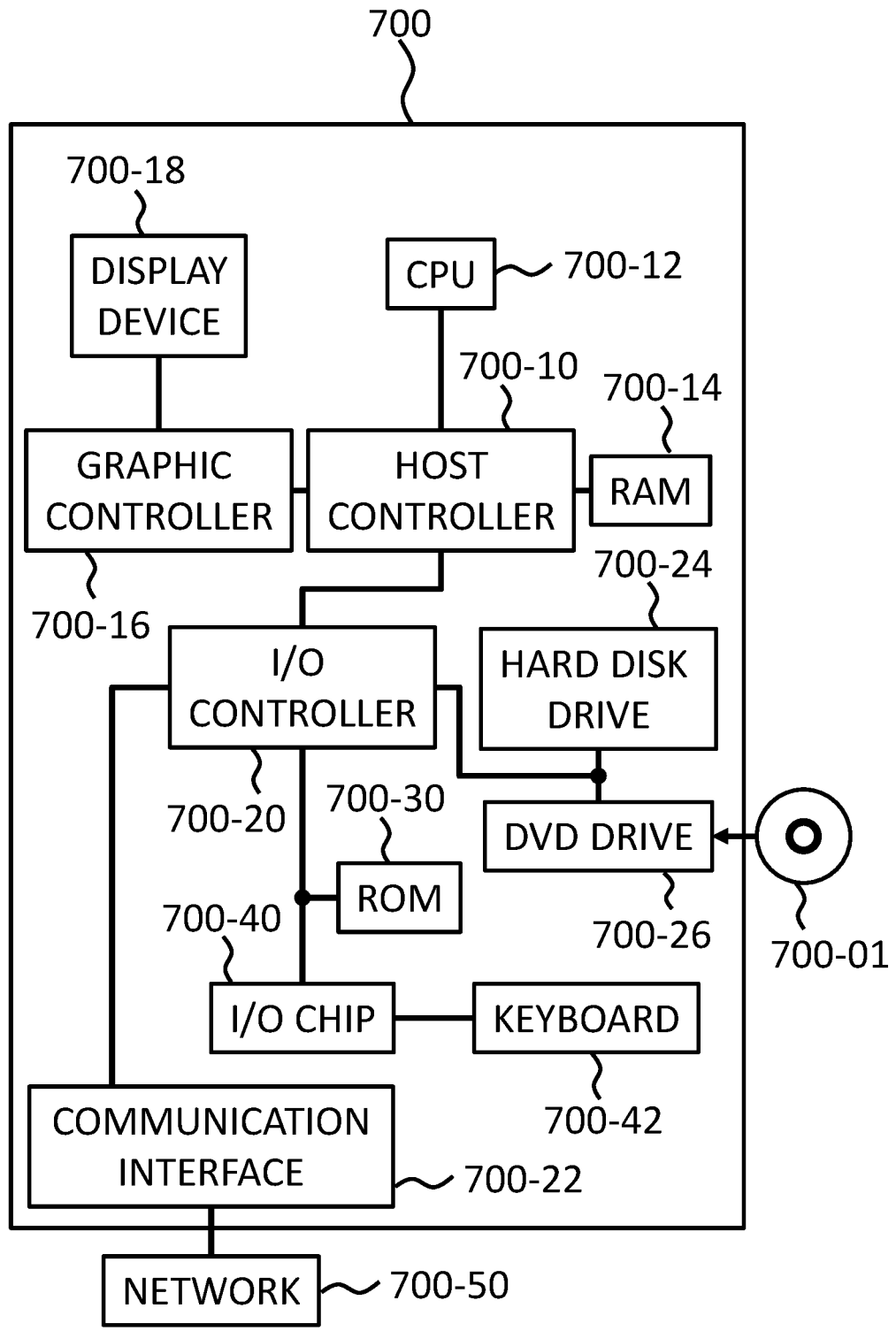
FIG. 7 shows an exemplary hardware configuration of a computer configured for cloud service utilization, according to an embodiment of the present invention.

FIG. 7 shows an exemplary hardware configuration of a computer configured to perform the foregoing operations, according to an embodiment of the present invention. A program that is installed in the computer 700 can cause the computer 700 to function as or perform operations associated with apparatuses of the embodiments of the present invention or one or more sections (including modules, components, elements, etc.) thereof, and/or cause the computer 700 to perform processes of the embodiments of the present invention or steps thereof. Such a program may be executed by the CPU 700-12 to cause the computer 700 to perform certain operations associated with some or all of the blocks of flowcharts and block diagrams described herein.

The computer 700 according to the present embodiment includes a CPU 700-12, a RAM 700-14, a graphics controller 700-16, and a display device 700-18, which are mutually connected by a host controller 700-10. The computer 700 also includes input/output units such as a communication interface 700-22, a hard disk drive 700-24, a DVD-ROM drive 700-26 and an IC card drive, which are connected to the host controller 700-10 via an input/output controller 700-20. The computer also includes legacy input/output units such as a ROM 700-30 and a keyboard 700-42, which are connected to the input/output controller 700-20 through an input/output chip 700-40.

The CPU 700-12 operates according to programs stored in the ROM 700-30 and the RAM 700-14, thereby controlling each unit. The graphics controller 700-16 obtains image data generated by the CPU 700-12 on a frame buffer or the like provided in the RAM 700-14 or in itself, and causes the image data to be displayed on the display device 700-18.

The communication interface 700-22 communicates with other electronic devices via a network 700-50. The hard disk drive 700-24 stores programs and data used by the CPU 700-12 within the computer 700. The DVD-ROM drive 700-26 reads the programs or the data from the DVD-ROM 700-01, and provides the hard disk drive 700-24 with the programs or the data via the RAM 700-14. The IC card drive reads programs and data from an IC card, and/or writes programs and data into the IC card.

The ROM 700-30 stores therein a boot program or the like executed by the computer 700 at the time of activation, and/or a program depending on the hardware of the computer 700. The input/output chip 700-40 may also connect various input/output units via a parallel port, a serial port, a keyboard port, a mouse port, and the like to the input/output controller 700-20.

A program is provided by computer readable media such as the DVD-ROM 700-01 or the IC card. The program is read from the computer readable media, installed into the hard disk drive 700-24, RAM 700-14, or ROM 700-30, which are also examples of computer readable media, and executed by the CPU 700-12. The information processing described in these programs is read into the computer 700, resulting in cooperation between a program and the above-mentioned various types of hardware resources. An apparatus or method may be constituted by realizing the operation or processing of information in accordance with the usage of the computer 700.

For example, when communication is performed between the computer 700 and an external device, the CPU 700-12 may execute a communication program loaded onto the RAM 700-14 to instruct communication processing to the communication interface 700-22, based on the processing described in the communication program. The communication interface 700-22, under control of the CPU 700-12, reads transmission data stored on a transmission buffering region provided in a recording medium such as the RAM 700-14, the hard disk drive 700-24, the DVD-ROM 700-01, or the IC card, and transmits the read transmission data to network 700-50 or writes reception data received from network 700-50 to a reception buffering region or the like provided on the recording medium.

In addition, the CPU 700-12 may cause all or a necessary portion of a file or a database to be read into the RAM 700-14, the file or the database having been stored in an external recording medium such as the hard disk drive 700-24, the DVD-ROM drive 700-26 (DVD-ROM 700-01), the IC card, etc., and perform various types of processing on the data on the RAM 700-14. The CPU 700-12 may then write back the processed data to the external recording medium.

Various types of information, such as various types of programs, data, tables, and databases, may be stored in the recording medium to undergo information processing. The CPU 700-12 may perform various types of processing on the data read from the RAM 700-14, which includes various types of operations, processing of information, condition judging, conditional branch, unconditional branch, search/replace of information, etc., as described throughout this disclosure and designated by an instruction sequence of programs, and writes the result back to the RAM 700-14. In addition, the CPU 700-12 may search for information in a file, a database, etc., in the recording medium. For example, when a plurality of entries, each having an attribute value of a first attribute is associated with an attribute value of a second attribute, are stored in the recording medium, the CPU 700-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules mar be stored in the computer readable media on or near the computer 700. In addition, a recording medium such as a hard disk or a RAM provided in a server system connected to a dedicated communication network or the Internet can be used as the computer readable media, hereby providing the program to the computer 700 via the network.

A neural network in accordance with the present invention can be used for a myriad of applications including, but not limited to, classification, recognition e.g., speech recognition, speaker recognition, pattern recognition, etc.), robotics (e.g., robotic control, robotic decision making), machine control (e.g., controlling a movement of a machine e.g., an assembly line machine), or powering down the machine, or changing the operational state of the machine (e.g., faster, slower, on, off, full-power, low-power, etc.) based on an output of the neural network, and so forth. Thus, such a neural network can be used within systems including, but not limited to, classification systems (e.g., speech recognition systems, speaker recognition systems, pattern recognition systems, etc.), machine control systems (or machine controllers), etc. These and other applications to which the present invention can be applied are readily determined by one of ordinary skill in the art, given the teachings of the present invention provided herein, while maintaining the spirit of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is, not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and, forwards the computer readable program instructions for storage in a computer readable storage medium within the respective computing/processing device.

Computer readable program instructions for carrying out operations of the present invention may be assemble instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider.) In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified, in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon, the functionality involve. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize cloud service utilization.

What is claimed is:

1. A computer-implemented method, comprising:
   obtaining, by a processor, an action and observation sequence;
   inputting, by the processor, each of a plurality of time frames of the action and observation sequence sequentially into a plurality of input nodes of a First-In First-Out (FIFO)-based neural network; and
   updating, by the processor, a plurality of parameters of the FIFO-based neural network by using the neural network to approximate an action-value function for determining a subsequent action based on the action and observation sequence,
   wherein values from nodes for a same action are sequentially stored in a FIFO queue between neurons of the FIFO-based neural network.

2. The computer-implemented method of claim 1, wherein the action-value function is an energy function of the neural network.

3. The computer-implemented method of claim 1, wherein the action-value function is a linear function.

4. The computer-implemented method of claim 1, wherein the neural network includes:
   a plurality of layers among a plurality of nodes, the plurality of nodes including the input nodes, each of the plurality of layers sequentially forwarding input values of a given one of the plurality of time frames of the action and observation sequence to a subsequent one of the plurality of layers, the plurality of layers including:
      a first layer of the plurality of input nodes, the plurality of input nodes receiving input values representing an action and an observation of a current one of the plurality of time frames of the action and observation sequence, and
      a plurality of intermediate layers, each of the plurality of nodes in each of the plurality of intermediate layers forwarding a value representing an action or an observation to another one of the plurality of nodes in a subsequent or shared one of the plurality of layers, and
   a plurality of weight values among the plurality of parameters of the neural network, each of the plurality of weight values being applied to each value in the corresponding node to obtain a value propagating from a pre-synaptic node to a post-synaptic node.

5. The computer program product of claim 1, wherein the obtaining an action and observation sequence includes:
   selecting an action with which to proceed from a current one of the plurality of time frames of the action and observation sequence to a subsequent one of the plurality of time frames of the action and observation sequence;
   causing the selected action to be performed; and
   obtaining an observation of the subsequent one of the plurality of time frames of the action and observation sequence.

6. The computer program product of claim 5, wherein the observation obtained includes an actual reward.

7. The computer program product of claim 5, wherein the selecting an action includes evaluating each reward probability of a plurality of possible actions according to a probability function based on the action-value function, and wherein the selected action among the plurality of possible actions yields the largest reward probability from the probability function.

8. The computer program product of claim 1, wherein the updating the plurality of parameters of the neural network includes:
   determining a current action-value from an evaluation of the action-value function in consideration of an actual reward, and
   caching a previous action-value determined for a previous one of the plurality of time frames from the action-value function.

9. The computer program product of claim 8, wherein the action-value function is evaluated with respect to nodes of the neural network associated with actions of the action and observation sequence.

10. The computer program product of claim 9, wherein the updating the plurality of parameters of the neural network further includes calculating a temporal difference error based on the previous action-value, the current action-value, and the plurality of parameters.

11. The computer program product of claim 10, wherein the updating the plurality of parameters of the neural network includes updating a plurality of function parameters based on the temporal difference error and a learning rate.

12. The computer program product of claim 11, wherein the updating the plurality of parameters of the neural network includes updating a plurality of eligibility traces and a plurality of first-in-first-out queues.

13. The computer program product of claim 1, wherein the neural network comprises one or more Dynamic Boltzmann Machines.

14. The computer program product of claim 1, wherein the action value function is an action-value function, Q, wherein $$Q(S_t, A_t) \leftarrow Q(S_t, A_t) + \eta(R_{t+1} + \gamma Q(S_{t+1}, A_{t+1}) - Q(S_t, A_t)),$$

wherein $S_t$ is a state at a time t, $A_t$ is an action taken at the time t, $R_{t+1}$ is a reward received after taking the action $A_t$, $\gamma$ is a discount factor for a future reward, and $\eta$ is a learning rate, and wherein a Markovian state is not observable, and $S_t$ refers to an entire history of observations and actions before t.

15. The computer program product of claim 14, further comprising determining the subsequent action further based on a policy, wherein the policy is determined based on the entire history of observations and actions before t.

16. The computer program product of claim 1, wherein the action-value function is parameterized using free-energy-based neural network models, trained using non-linear temporal difference (TD)-learning.

17. The computer program product of claim 1, wherein determining the subsequent action is performed by sampling each bit of the action independently of each other.

18. The computer program product of claim 1, wherein the nodes comprises at least one presynaptic neuron connected at least one post-synaptic neuron via a respective one of the plurality of FIFOs.

* * * * *